US012603325B2

(12) United States Patent
Yonemaru

(10) Patent No.: US 12,603,325 B2
(45) Date of Patent: Apr. 14, 2026

(54) ELECTROLYTE SOLUTION FOR ELECTROCHEMICAL DEVICES, PLASTIC COMPOSITION, USE AND PRODUCTION METHOD

(71) Applicant: ZEON CORPORATION, Tokyo (JP)

(72) Inventor: Hiroyuki Yonemaru, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 909 days.

(21) Appl. No.: 17/904,595

(22) PCT Filed: Feb. 25, 2021

(86) PCT No.: PCT/JP2021/007174
§ 371 (c)(1),
(2) Date: Aug. 19, 2022

(87) PCT Pub. No.: WO2021/172456
PCT Pub. Date: Sep. 2, 2021

(65) Prior Publication Data
US 2023/0109546 A1 Apr. 6, 2023

(30) Foreign Application Priority Data
Feb. 28, 2020 (JP) ................................. 2020-034185

(51) Int. Cl.
*H01M 10/0569* (2010.01)
*H01M 4/02* (2006.01)
*H01M 4/583* (2010.01)
*H01M 4/60* (2006.01)

(52) U.S. Cl.
CPC ....... *H01M 10/0569* (2013.01); *H01M 4/583* (2013.01); *H01M 4/602* (2013.01); *H01M 2004/029* (2013.01); *H01M 2300/0028* (2013.01)

(58) Field of Classification Search
CPC ... H01M 10/0569; H01M 4/583; H01M 4/602
See application file for complete search history.

(56) References Cited

U.S. PATENT DOCUMENTS

| | | |
|---|---|---|
| 5,856,044 A | 1/1999 | McLin et al. |
| 2003/0049540 A1 | 3/2003 | Kohno et al. |
| 2004/0041537 A1 | 3/2004 | Ishida et al. |
| 2006/0196042 A1 | 9/2006 | Ishida et al. |
| 2007/0218352 A1 | 9/2007 | Kohno et al. |

| | | |
|---|---|---|
| 2016/0126551 A1 | 5/2016 | Sasaki |
| 2016/0218394 A1 | 7/2016 | Yamada et al. |
| 2018/0342754 A1 | 11/2018 | Sakamoto et al. |
| 2019/0058195 A1 | 2/2019 | Hanasaki et al. |
| 2019/0379049 A1* | 12/2019 | Ishihara ................ H01M 4/622 |

FOREIGN PATENT DOCUMENTS

| | | | |
|---|---|---|---|
| CN | 108475788 A | 8/2018 | |
| CN | 108933278 A | 12/2018 | |
| CN | 109997262 A | 7/2019 | |
| JP | S6191861 A | 5/1986 | |
| JP | H10334886 A | 12/1998 | |
| JP | 2002260739 A | 9/2002 | |
| JP | 2002359000 A | 12/2002 | |
| JP | 2003272634 A | 9/2003 | |
| JP | 2011040318 A | 2/2011 | |
| JP | 2012204303 A | 10/2012 | |
| JP | 2015133312 A | 7/2015 | |
| JP | 2016167408 A * | 9/2016 | ........ H01M 10/0569 |
| JP | 2017059369 A | 3/2017 | |
| JP | 2018185933 A | 11/2018 | |
| JP | 2018206757 A | 12/2018 | |
| JP | 2019114390 A | 7/2019 | |
| KR | 1020160015222 A | 2/2016 | |

OTHER PUBLICATIONS

Yuki Yamada et al., Electrochemistry, Dec. 5, 2014, pp. 1085-1090, vol. 82, Issue 12, with a partial English translation.
Aug. 30, 2022, International Preliminary Report on Patentability issued in the International Patent Application No. PCT/JP2021/007174.
Apr. 14, 2025, the Extended European Search Report issued by the European Patent Office in the corresponding European Patent Application No. 21761718.2.
Yuki Yamada et al., Possibility for secondary battery innovation based on specificity of high concentration electrolyte, Electrochemistry, Dec. 5, 2014, pp. 1085-1090, vol. 82, Issue 12, with a partial English translation.

* cited by examiner

*Primary Examiner* — Karie O'Neill Apicella
(74) *Attorney, Agent, or Firm* — KENJA IP LAW PC

(57) ABSTRACT
An electrolytic solution for an electrochemical device, including: a cation (C) that is a monovalent to trivalent metal ion; an anion (A); a solvent (SO) that is a compound having a molecular weight of 1,000 or less; and a polymer (P) that has a weight-average molecular weight of more than 10,000, wherein a content ratio of the solvent (SO) relative to 1 mol of the cation (C) is 0.5 to 4 mol, and a content ratio of the polymer (P) is 0.5% by weight or more. Also provided are a plastic composition, an electrode sheet, an insulating layer, and an electrochemical device including the electrolytic solution, as well as producing methods of these.

25 Claims, No Drawings

1

ELECTROLYTE SOLUTION FOR ELECTROCHEMICAL DEVICES, PLASTIC COMPOSITION, USE AND PRODUCTION METHOD

FIELD

The present invention relates to an electrolytic solution for an electrochemical device, a plastic composition, an electrode sheet for an electrochemical device, an insulating layer for an electrochemical device, producing methods of these, and an electrochemical device.

BACKGROUND

As to an electrolytic solution used as a constituent element of an electrochemical device, an electrolytic solution having an extremely higher salt concentration than a salt concentration that has been considered to be appropriate, i.e. a so-called highly concentrated electrolytic solution, has been known. There has been reported that the highly concentrated electrolytic solution has a possibility to be a solution that may have effects such as an enhancement in voltage resistance, a decrease in combustibility, and an improvement in transport number as compared with prior-art dilute electrolytic solutions (Patent Literature 1 and Non-Patent Literature 1). When such an electrolytic solution is applied to an electrochemical device, it is expected that the device achieves effects such as an increase in service life, a decrease in combustibility, and an increase in electric potential.

CITATION LIST

Patent Literature

Patent Literature 1: Japanese Patent Application Laid-Open No. 2015-133312 A

Non-Patent Literature

Non-Patent Literature 1: Electrochemistry, 82 (12), 1085-1090 (2014)

SUMMARY

Technical Problem

Due to the extremely high salt concentration, the highly concentrated electrolytic solution is prone to cause salting-out, and crystals of the salt once generated by the salting-out have low tendency to be redissolved. When such salting-out occurs in an electrolytic solution in an electrochemical device and the presence of crystals is maintained without redissolving, problems such as a decrease in performance of the electrolytic solution and damage to the device by the salt crystals may be caused. In particular, during transportation or storage of the device, the device may temporarily be exposed to a low-temperature environment that is much lower than normal use temperature. When such salting-out occurs in the electrolytic solution prior to production of the electrochemical device, a change in concentration, a decrease in flowability, and the like occur to prevent the production.

The highly concentrated electrolytic solution has a higher viscosity than the prior-art dilute electrolytic solutions. Therefore, the highly concentrated electrolytic solution incurs difficulty in operations during the production of the electrochemical device such as injection thereof into a space in the casing of the electrochemical device in the same manner as with the prior-art electrolytic solutions.

Accordingly, it is an object of the present invention to provide an electrolytic solution for an electrochemical device with which advantageous effects of a highly concentrated electrolytic solution, such as an enhancement in voltage resistance, a decrease in combustibility, and an improvement in transport number, are achieved and occurrence of salting-out is prevented, a material for constituting an electrochemical device with which such an electrolytic solution is in a readily available form, and a method for producing the same.

It is a further object of the present invention to provide an electrode sheet for an electrochemical device and an insulating layer for an electrochemical device that can achieve effects such as an increase in service life, a decrease in combustibility, and an increase in electric potential of an electrochemical device and can be easily produced, producing methods of the electrode sheet and the insulating layer, and an electrochemical device.

Solution to Problem

The present inventor has investigated to solve the above-described problems, and as a result, has found that when a specific polymer is further added to the highly concentrated electrolytic solution, salting-out can be suppressed.

The highly concentrated electrolytic solution including such a polymer has a further higher viscosity. As a countermeasure thereto, the inventor has arrived at an idea that such a highly concentrated electrolytic solution is mixed with a solid material such as an active material to form a plastic composition. That is, in production of a constituent element of an electrochemical device such as an electrode, molding of such a plastic composition into a desired shape of the constituent element enables easy production. Based on these findings, the inventor has completed the present invention.

That is, the present invention is as follows.

(1) An electrolytic solution for an electrochemical device, comprising:
    a cation (C) that is a monovalent to trivalent metal ion;
    an anion (A);
    a solvent (SO) that is a compound having a molecular weight of 1,000 or less; and
    a polymer (P) that has a weight-average molecular weight of more than 10,000, wherein
    a content ratio of the solvent (SO) relative to 1 mol of the cation (C) is 0.5 to 4 mol, and
    a content ratio of the polymer (P) is 0.5% by weight or more.

(2) The electrolytic solution according to (1), having a viscosity of 500 cP or more.

(3) The electrolytic solution according to (1) or (2), wherein the anion (A) is an anion containing a boron atom, a fluorine atom, a phosphorus atom, or 2 or more thereof.

(4) The electrolytic solution according to (3), wherein:
    the anion (A) includes an anion selected from the group consisting of $(B(R^X)_{n1}-F)^-$, $(P(R^X)_{n2}-F)^-$, $(B(R^X)_{n3})^-$, and mixtures thereof;
    $R^X$ is a monovalent group or a divalent group that may be, when a plurality thereof exist, the same or different from each other;

the monovalent group is a halogen atom, an alkyl group, an alkenyl group, an alkynyl group, or a monovalent organic ether group;

the divalent group is an alkylene group, an alkenylene group, an alkynylene group, a divalent organic ether group, or an oxo group;

the alkyl group, alkenyl group, alkynyl group, monovalent organic ether group, alkylene group, alkenylene group, alkynylene group, and divalent organic ether group may be substituted with a halogen atom, may be substituted with an oxo group, or may have a heteroatom interposed in a part of the chain;

if $R^X$'s are all monovalent, n1 is 3, and if one of $R^X$'s is divalent and the others are monovalent, n1 is 2;

if $R^X$'s are all monovalent, n2 is 5, if one of $R^X$'s is divalent and the others are monovalent, n2 is 4, and if two of $R^X$'s are divalent and the others are monovalent, n2 is 3; and if $R^X$'s are all monovalent, n3 is 4, if one of $R^X$'s is divalent and the others are monovalent, n3 is 3, and if two of $R^X$'s are divalent, n3 is 2.

(5) The electrolytic solution according to (4), wherein the anion (A) includes an anion selected from the group consisting of $PF_6^-$, $BF_4^-$, a difluoro(oxalato) borate ion, a bis(oxalate) borate ion, and mixtures thereof.

(6) The electrolytic solution according to any one of (1) to (5), wherein the solvent (SO) includes a flame retardant solvent selected from the group consisting of trimethyl phosphate, triethyl phosphate, tripropyl phosphate, tributyl phosphate, trimethyl phosphite, triethyl phosphite, tripropyl phosphite, tributyl phosphite, triphenyl phosphate, triphenyl phosphite, a phosphazene-containing compound, a substituted compound with a substituent in a portion of a hydrocarbon chain of any of these compounds, and mixtures thereof.

(7) The electrolytic solution according to any one of (1) to (6), wherein the polymer (P) is a copolymer.

(8) The electrolytic solution according to any one of (1) to (7), wherein the cation (C) includes a divalent or trivalent metal ion.

(9) The electrolytic solution according to any one of (1) to (8), wherein a weight-average molecular weight of the polymer (P) is 100,000 or more.

(10) A producing method of the electrolytic solution according to any one of (1) to (9), comprising:

a step of dissolving one or two or more types of materials containing the cation (C) and the anion (A), and the polymer (P) in the solvent (SO).

(11) The producing method according to (10), wherein:

the anion (A) includes a first anion (A1) and a second anion (A2);

the first anion (A1) is an anion having a largest content molar ratio in the anion (A);

the second anion (A2) is an anion having a next largest content molar ratio subsequent to the first anion in the anion (A); and the method comprises a step of adding a salt containing the second anion (A2) to the solvent (SO), and after that, a step of adding a salt containing the first anion (A1).

(12) The producing method according to (10) or (11), comprising distilling off the solvent (SO) after the cation (C) and the salt containing the anion (A) are dissolved in the solvent (SO).

(13) A plastic composition for use in an electrochemical device, the composition comprising the electrolytic solution according to any one of (1) to (9) and a solid material, wherein the plastic composition has plasticity.

(14) The plastic composition according to (13), wherein the solid material includes an active material.

(15) The plastic composition according to (13), wherein the solid material includes an inorganic solid electrolyte (SE).

(16) The plastic composition according to any one of (13) to (15), wherein the solid material includes a fibrous material.

(17) The plastic composition according to (16), wherein the fibrous material has an average fiber diameter of 100 nm or less.

(18) The plastic composition according to (16) or (17), wherein the fibrous material is selected from the group consisting of a polytetrafluoroethylene fiber, a cellulose nanofiber, a carbon nanotube, and combinations thereof.

(19) The plastic composition according to any one of (16) to (18), wherein the fibrous material is a monolayer carbon nanotube.

(20) The plastic composition according to any one of (13) to (19), wherein the solid material includes a particulate solid material and a fibrous material, and the fibrous material is present in a state of bridging between particles of the particulate solid material.

(21) An electrode sheet for an electrochemical device, comprising the plastic composition according to any one of (13) to (20).

(22) An insulating layer for an electrochemical device, comprising the plastic composition according to any one of (13) to (20).

(23) A producing method of an electrode sheet for an electrochemical device, comprising molding the plastic composition according to any one of (13) to (20) into a shape of an electrode sheet.

(24) A producing method of an insulating layer for an electrochemical device, comprising molding the plastic composition according to any one of (13) to (20) into a shape of an insulating layer.

(25) An electrochemical device comprising: the electrode sheet for an electrochemical device according to (21), the insulating layer for an electrochemical device according to (22), or both.

(26) The electrochemical device according to (25), being a bipolar device.

Advantageous Effects of Invention

The present invention can provide an electrolytic solution for an electrochemical device with which advantageous effects of a highly concentrated electrolytic solution, such as an enhancement in voltage resistance, a decrease in combustibility, and an improvement in transport number, are achieved and occurrence of salting-out is prevented, a plastic composition for constituting an electrochemical device with which such an electrolytic solution is readily available, and a method for producing the same.

The present invention further provides an electrode sheet for an electrochemical device and an insulating layer for an electrochemical device that can achieve effects such as an increase in service life, a decrease in combustibility, and an increase in electric potential of an electrochemical device and can be easily produced, producing methods of the electrode sheet and the insulating layer, and an electrochemical device.

DESCRIPTION OF EMBODIMENTS

Hereinafter, the present invention will be described in detail with reference to embodiments and examples. However, the present invention is not limited to the embodiments and examples described hereinafter, and may be freely modified for implementation without departing from the scope of claims of the present invention and the scope of their equivalents.

(1. Electrolytic Solution)

The electrolytic solution of the present invention is an electrolytic solution for an electrochemical device containing a specific cation (C), an anion (A), a specific solvent (SO), and a specific polymer (P).

(1.1. Cation (C))

The cation (C) is a monovalent to trivalent metal ion. That is, the cation (C) may be 1 or more types of monovalent metal ions, 1 or more types of divalent metal ions, 1 or more types of trivalent metal ions, or a combination thereof. In the electrolytic solution, the cation (C) may exist while maintaining ionization equilibrium with the anion (A). The cation (C) is a compound which is capable of constituting a salt with the anion (A), and is usually a compound at least a part of which is capable of maintaining its dissolved state without salting-out in the solvent (SO) under temperature and pressure conditions from the production of an electrolytic solution to the production of an electrochemical device using the electrolytic solution. More specifically, the cation (C) may be a compound capable of maintaining a state in which at least 1% by weight thereof is dissolved in the solvent (SO) at normal temperature and normal pressure, e.g., 25° C. and 1 atm. Examples of the cations (C) may include cations contained in various salts known in the art, which are available for electrolytic solutions for electrochemical devices.

The cation (C) is preferably an ion selected from the group consisting of an alkali metal ion, an alkaline earth metal ion, an aluminum ion, and combinations thereof.

Examples of alkaline metal ions may include $Li^+$, $Na^+$, $K^+$, and $Cs^+$. Examples of alkaline earth metal ions may include $Mg^{2+}$ and $Ca^{2+}$. Among these, when the electrochemical device composed of the electrolytic solution is a secondary battery, $Li^+$, $Mg^{2+}$ and a combination thereof are preferable, and $Li^+$ and a combination of $Li^+$ and $Mg^{2+}$ are more preferable.

The electrolytic solution of the present invention may contain a cation other than the cation (C). However, also in such a case, in the entire electrolytic solution, it is preferable that the ratio of the cation (C) is 2.5 mol/L or more in order to exert advantageous effects as the electrolytic solution. The upper limit of the ratio of the cation (C) is not particularly limited, and may be, for example, 10 mol/L or less.

The cation (C) may contain a divalent or trivalent metal ion. For the sake of designing an electrochemical device, it may be preferable that the cation (C) contains a divalent or trivalent metal ion, rather than the cation (C) is constituted of only a monovalent metal ion. However, divalent and trivalent metal ions tend to undergo salting-out. Herein, when the configuration of the present invention is adopted as an electrolytic solution, it is possible to suppress salting-out while enjoying the advantageous effects of such divalent and trivalent metal ions. As a specific example, when $Li^+$ and $Mg^{2+}$ are used in combination as the cation (C), precipitation of $Li^+$ can be suppressed to improve the cycle characteristics, and the strength of the electrodes can be increased in some cases.

(1.2. Anion (A))

The electrolytic solution of the present invention may contain the anion (A). The anion (A) may contain an anion introduced into a system as a counter anion for the cation (C) and for other cations as optional components.

Examples of the anions (A) may include anions contained in various salts known in the art, which are available for an electrolytic solution for an electrochemical device. More specific examples thereof may include various anions including a boron atom, a fluorine atom, a phosphorus atom, and two or more thereof.

Preferable examples of the anions contained in the anion (A) may include an anion selected from the group consisting of $(B(R^X)_{n1}\text{—F})^-$, $(P(R^X)_{n2}\text{—F})^-$, and $(B(R^X)_{n3})^-$, and mixtures thereof. When these anions are adopted as the anion (A), the effect that corrosion of a current collector foil can be alleviated is obtained.

$R^X$ is a monovalent group or a divalent group that may be, when a plurality thereof exist, the same or different from each other. The monovalent group is a halogen atom, an alkyl group, an alkenyl group, an alkynyl group, or a monovalent organic ether group. The divalent group is an alkylene group, an alkenylene group, an alkynylene group, a divalent organic ether group, or an oxo group. The alkyl group, alkenyl group, alkynyl group, monovalent organic ether group, alkylene group, alkenylene group, alkynylene group, and divalent organic ether group may be substituted with a halogen atom, may be substituted with an oxo group, or may have a heteroatom interposed in a part of the chain. If $R^X$'s are all monovalent, n1 is 3, and if one of $R^X$'s is divalent and the others are monovalent, n1 is 2. If $R^X$'s are all monovalent, n2 is 5, if one of $R^X$'s is divalent and the others are monovalent, n2 is 4, and if two of $R^X$'s are divalent and the others are monovalent, n2 is 3. If $R^X$'s are all monovalent, n3 is 4, if one of $R^X$'s is divalent and the others are monovalent, n3 is 3, and if two of $R^X$'s are divalent, n3 is 2.

When $R^X$ is a monovalent group, preferable examples thereof may include a fluorine atom, $\text{—CF}_3$, $\text{—C}_2\text{F}_5$, and —CN.

When $R^X$ is a divalent group, preferable examples thereof may include an oxo group (=O), $\text{—O—CO—CO—O—}$, and $\text{—O—CO—CH}_2\text{—CO—O—}$. When $R^X$ is a divalent group, both bonds of the divalency may form a structure bonded to a boron atom or a phosphorus atom.

More specific examples of $(B(R^X)_{n1}\text{—F})^-$, $(P(R^X)_{n2}\text{—F})^-$, and $(B(R^X)_{n3})^-$ may include $PF_6^-$ (all $R^X$s are F, and n2=5), $BF_4^-$ (all $R^X$s are F, and n3=4), a difluoro(oxalato)borate ion (DFOB wherein two of $R^A$'s are —F, one of them is $\text{—O—CO—CO—O—}$, and n3=3), and a bis(oxalate)borate ion (two of $R^X$'s are $\text{—O—CO—CO—O—}$, and n3=2), and mixtures thereof.

When the anion (A) contains a plurality of cations, an anion having the largest content molar ratio in the anion (A) is referred to as a first anion (A1), an anion having a next largest content molar ratio subsequent to the first anion (A1) is referred to as a second anion (A2), and an anion having a next largest content molar ratio subsequent to the second anion (A2) is referred to as a third anion (A3), and the same applies to followers. In this case, it is preferable to select, as the first anion (A1), an anion which contributes to ionic conductivity and has high ionic conductivity. Specific examples of anions that may have such an effect may include a bis(fluorosulfonyl)imide ion (FSI), a bis(trifluoromethanesulfonyl)imide ion (TFSI), $BF_4^-$, a difluoro(oxalato)borate ion, and mixtures thereof.

On the other hand, the second anion (A2) may be added for the purpose of providing an additional effect in combination with the first anion (A1). Examples of such effects may include suppression of current collectors' corrosion, and stabilization by surface coating of an active material. Examples of anions which may exert such effects may include a BFx-based ion, a PFx-based ion, a difluoro (oxalato) borate ion, a bis(oxalate) borate ion, and mixtures thereof. Herein, the BFx-based ion refers to one type of anion in which a single anion contains a combination of one boron atom and 1 to 4 fluorine atoms, or a mixture containing 2 or more types of such anions. The PFx-based ion refers to one type of anion in which a single anion contains a combination of one phosphorus atom and 1 to 6 fluorine atoms, or a mixture of 2 or more types of such anions.

The ratio of the anion (A) in the electrolytic solution of the present invention is not particularly limited, and may be an amount equivalent to, for example, the cation (C) and a cation as another optional component.

(1.3. Solvent (SO))

The solvent (SO) is a compound having a molecular weight of 1,000 or less. The lower limit of the molecular weight of the solvent (SO) is not particularly limited, and may be, for example, 40 or more.

The solvent (SO) may be water, a heteroatom-containing organic compound (O), or a mixture thereof. The heteroatom-containing organic compound (O) may be preferably a compound having no ionic group. That is, the heteroatom-containing organic compound (O) may be a compound other than a compound having an ionic group. Herein, a compound having an ionic group is a cation or an anion, and includes a compound having a plurality of ionic groups in one molecule, and a betaine having a positive and negative charge.

As an example of the solvent (SO), various compounds known as solvents which may be used as a solvent in an electrolytic solution for an electrochemical device may be used. Among these, one or more types of compounds having performance in accordance with a desired application may be appropriately selected and, if necessary, combined for use. For example, when it is desired to increase the ionic conductivity of the electrolytic solution, an organic solvent with a low boiling point or a mixed solvent containing an organic solvent with a low boiling point in a high ratio may be used as the solvent (SO). Examples of such organic solvents with a low boiling point may include dimethyl carbonate, monoglyme, methyl formate, methyl acetate, methyl alcohol, acetonitrile (AN), and mixtures thereof.

The aforementioned at least one solvent is preferably selected from a compound (SO—S) which, at room temperature and 1 atm, is solid and exhibits a liquid state by mixing with the cation (C) and the anion (A). Even in an incident wherein the solvent evaporates and diffuses to the surroundings due to overheating during a producing process or due to heat generation caused by failure of an electrochemical device, a compound having a property of becoming a solid at around room temperature can condense to be a solid and does not widely leak to the surroundings. Therefore, such a compound lead to a high safety. Herein, the term "room temperature" refers to a temperature range around 25° C., more specifically a temperature of 25° C., and it is preferable for the solvent to be a solid even at a higher temperature. Preferable melting point of the compound is 5° C. or higher, more preferably 25° C. or higher, and still more preferably 40° C. or higher. The upper limit of the melting point is not particularly limited, and may be, for example, 200° C. or lower. The ratio of the compound (SO—S) to the entire solvent (SO) is preferably 50 mol % or more, more preferably 60 mol %, still more preferably 70 mol % or more, and may be 100 mol %. Examples of the compounds (SO—S) may include ethylene carbonate (EC), N-methyloxazolidone, N,N-dimethylimidazolidinone, sulfolane (SL), dimethyl sulfone, malononitrile, succinonitrile, and dimethyl oxalate. The compound (SO—S) is dissolved by mixing with a salt even if it is a solid at room temperature, and may exhibit a liquid state and constitute an electrolytic solution.

When it is desired to reduce the combustibility of the electrolytic solution, an organic solvent with a high boiling point and/or water, or a mixed solvent containing an organic solvent with a high boiling point and/or water in a high ratio may be used as the solvent (SO). The boiling point of such an organic solvent with a high boiling point may be preferably 130° C. or higher, more preferably 160° C. or higher, and still more preferably 200° C. or higher. The upper limit of the boiling point is not particularly limited, and may be, for example, 350° C. or lower. Specific examples of the organic solvents with a higher boiling point may include γ-butyrolactone, propylene carbonate, ethylene carbonate (EC), N-methyloxazolidone, N,N-dimethylimidazolidinone, dimethyl sulfone (DMS), sulfolane (SL), dimethyl sulfone, malononitrile, succinonitrile, dimethyl malonate, dimethyl oxalate, diglyme, triglyme, tetraglyme, and mixtures thereof.

In addition to or instead of an organic solvent with a high boiling point, a flame retardant solvent may be used. Examples of flame retardant solvents may include trimethyl phosphate, triethyl phosphate, tripropyl phosphate, tributyl phosphate, trimethyl phosphite, triethyl phosphite, tripropyl phosphite, tributyl phosphite, triphenyl phosphate, triphenyl phosphite, and a phosphazene-containing compound. Further examples of the flame retardant solvents may include a substituted compound with a substituent in a portion of a hydrocarbon chain of the various compounds described above. Additionally, mixtures of two or more of the above-mentioned compounds and substituted compounds may also be employed. Examples of the substituents may include a halogen atom such as a fluorine atom, a chlorine atom, and a bromine atom. When the flame retardant agent is a phosphate ester or a phosphite ester, the alkyl group is preferably halogen-substituted because of its high flame retardant effect. Specific examples of the phosphazene-containing compounds may include monoethoxypentafluorocyclotriphosphazene, diethoxytetrafluorocyclotriphosphazene, and monophenoxypentafluorocyclotriphosphazene. When the solvent (SO) contains a flame retardant solvent, the content ratio of the flame retardant solvent relative to the entire solvent (SO) may be 0.5 to 20% by weight.

In a preferable example, the solvent (SO) includes a cyclic carbonate. In particular, when the negative electrode material of the electrochemical device is a graphite-based material, inclusion of the cyclic carbonate as the solvent (SO) in the electrolytic solution brings about an effect of reduction in an irreversible capacity of the negative electrode at the time of initial charging. Specific examples of the cyclic carbonates may include ethylene carbonate, vinylene carbonate, vinyl ethylene carbonate, and compounds having the aforementioned ones in its structure.

When the electrochemical device is a secondary battery such as a lithium ion secondary battery, examples of the preferable solvents (SO) may include acetonitrile, ethyl methyl carbonate, ethylene carbonate, sulfolane, dimethyl sulfone, gamma-butyrolactone, fluoroethylene carbonate, succinonitrile, N-methyloxazolidone, N,N-dimethyl oxazolidinone, trimethyl phosphate, and mixtures thereof.

Other than the solvent (SO), the electrolytic solution of the present invention may contain a liquid compound with a molecular weight of more than 1,000 and less than 100,000. Also in such a case, in the entire electrolytic solution, the ratio of the cation (C) is preferably 2.5 mol/L or more.

In the electrolytic solution of the present invention, the content ratio of the solvent (SO) relative to the cation (C) falls within a specific range. That is, the content ratio of the solvent (SO) relative to 1 mol of the cation (C) is 0.5 mol or more, preferably 1 mol or more, and more preferably 1.5 mol or more, while being 4 mol or less, preferably 3.5 mol or less, and more preferably 3.0 mol or less. When the content ratio of the solvent (SO) relative to the cation (C) is set to a large value that is equal to or greater than the above-described lower limit, the ionic conductivity can be increased and the performance of the electrochemical device can be easily improved. When the content ratio of the solvent (SO) relative to the cation (C) is set to a small value that is equal to or lower than the above-described upper limit, it is possible to obtain good volatility, flame retardance, and oxidation resistance of the electrolytic solution.

(1.4. Polymer (P))

The polymer (P) is a soluble polymer. As used herein, the term "solubility of the polymer (P)" means a capability of the polymer (P) to maintain a dissolved state in an electrolytic solution under temperature and pressure conditions in the process from the production of the electrolytic solution to the production of an electrochemical device using the electrolytic solution. More specifically, when the polymer (P) is added to the solvent (SO) at normal temperature and normal pressure, e.g., 25° C. and 1 atm to prepare a solution, if a state where at least 1% by weight of the polymer (P) is dissolved in such a solution can be maintained, such a polymer may be considered as a soluble polymer.

The polymer (P) has a weight-average molecular weight of more than 10,000, preferably 100,000 or more, more preferably 200,000 or more, still more preferably 300,000 or more, and still more preferably 400,000 or more. On the other hand, the upper limit of the weight-average molecular weight may be preferably 10,000,000 or less, more preferably 3,000,000 or less. When the weight-average molecular weight is equal to or more than the above-described lower limit, the viscosity of the electrolytic solution can be greatly increased with a small addition amount in the electrolytic solution, and salting-out can be effectively suppressed. When the weight-average molecular weight is equal to or less than the above-described upper limit, it is possible to easily maintain the liquid state of the electrolytic solution. The molecular weight of the polymer (P) may be measured, for example, according to JIS K7252.

Examples of the polymers (P) may include a polyether-based polymer, an acrylic-based polymer, a polyacrylonitrile-based polymer, a polyoxazoline-based polymer, an aliphatic polycarbonate-based polymer, and mixtures thereof. More specific examples thereof may include polyethylene oxide, an ethylene oxide copolymer, an ethylene oxide side-chain polymer, an epichlorhydrin rubber, a polyvinyl acetate, a vinyl chloride-vinyl acetate copolymer, poly(2-ethyl-2-oxazoline), poly(2-methyl-2-oxazoline), polyoxazolidinone, an oxazoline side-chain copolymer, poly-N-vinylacetamide, polyvinylpyrrolidone, polyacrylonitrile, a nitrile rubber, an acrylic ester copolymer, polymethyl methacrylate, a styrene-acrylate copolymer, and an acrylic rubber. Any of these polymers may be solely used. Alternatively, two or more types thereof may be used in combination.

The polymer (P) is preferably a polymer with a hetero element in its main chain. Examples of the main chain structures with a hetero element may include —O— and —N—. A polymer with a hetero element in its main chain has high affinity for the solvent (SO), and therefore, it tends to be capable of achieving dissolution in the solvent (SO) at a low temperature and with a reduced power in the production of an electrolytic solution, and also capable of dissolving the polymer (P) at a high concentration. Thus, such a polymer is preferably used. Preferable examples of the polymer may include an ethylene oxide-based polymer and an oxazoline-based polymer.

The polymer (P) is further preferably a copolymer. A copolymer tends to have lower crystallizability than a homopolymer, and therefore, it tends to be more easily dissolved in the solvent (SO) in the production of an electrolytic solution, and the polymer (P) itself is less likely to crystallize and precipitate in an electrolytic solution. Thus, such a copolymer is particularly preferable. Preferable examples of the copolymers may include a polyether-based copolymer such as an ethylene oxide-propylene oxide copolymer, and an oxazoline-based copolymer such as a (2-ethyl-2-oxazoline)-(2-methyl-2-oxazoline) copolymer.

In the electrolytic solution of the present invention, the content ratio of the polymer (P) is 0.5% by weight or more, preferably 1% by weight or more, and more preferably 2% by weight or more, and is preferably 40% by weight or less, and more preferably 20% by weight or less. When the content ratio is equal to or more than the above-described lower limit, a high salting-out suppressing effect can be obtained. When the content ratio is equal to or less than the above-described upper limit, a large decrease in ionic conductivity can be suppressed, and a liquid state of an electrolytic solution can be easily maintained.

(1.5. Properties of Electrolytic Solution)

The viscosity of the electrolytic solution of the present invention is preferably 500 cP or more, and more preferably 700 cP or more, and is preferably 10,000,000 cP or less, and more preferably 1,000,000 cP or less. When the viscosity of the electrolytic solution at 25° C. is equal to or more than the above-described lower limit, a high salting-out suppressing effect can be obtained. In particular, even when a precipitate is generated as a result of salting-out, the size of the precipitate can be made smaller. Without wishing to be bound to any particular theory, such an effect is considered to be because movement of the solute is prevented during salting-out in the solution with a high viscosity and a salt is precipitated without forming a large weight. When the viscosity of the electrolytic solution is equal to or more than the above-described lower limit, leakage of the electrolytic solution from an electrode is suppressed. This is effective in working stability of the electrochemical device and suppression of liquid leakage. However, when the viscosity is more than 700 cP, it takes a long period of time to inject the liquid into a porous electrode. Thus, a process of producing an electrode without a liquid-injecting step may be selected. On the other hand, when the viscosity of the electrolytic solution is equal to or less than the above-described upper limit, the flowing state of the electrolytic solution can be easily maintained. Even when the flowability of the electrolytic solution is lost to cause a gel state, the electrolytic solution may become the electrolytic solution of the present invention. However, the gelation leads to a decrease in ionic conductivity, and thus the ionic conductivity of the electrolytic solution at 25° C. is preferably $10^{-4}$ S/cm or more regardless of the appearance of the electrolytic solution. The upper limit of such ionic conductivity is not particularly limited, and for example, may be $10^{-1}$ S/cm or less.

In particular, flowability of the electrolytic solution is necessary during production of an electrode and an insulating layer of the electrochemical device, and elevation of the temperature during the processing may be performed for adjusting the viscosity in the above-described viscosity range.

The viscosity in the present invention refers to a viscosity measured with an EMS viscometer (EMS-1000S manufactured by Kyoto Electronics Manufacturing Co., Ltd.) at a rotation number of 1,000 rpm under a hermetically sealed condition so that the composition of the electrolytic solution is not changed and a water moisture content in air is prevented from entering. The viscosity measured by this measurement method is basically the same value as a value measured according to JIS Z8803. When the measurement is difficult at an operating temperature because of a too high viscosity of the electrolytic solution, the measurement may be performed by increasing the temperature. Thus, the viscosity at 25° C. is found to be equal to or more than the measured value. Alternatively, the viscosity may be determined by measuring the viscosity at some points at an elevated temperature and extrapolating the viscosity to the operating temperature. When the measurement is nevertheless difficult, another viscometer that is available for a high viscosity measurement may be used with a confirmation of the difference between a viscosity measured by the viscometer and a viscosity measured by the other viscometer.

(2. Producing Method of Electrolytic Solution)

The electrolytic solution of the present invention may be produced by any producing method. The electrolytic solution may usually be produced by a producing method including a step of dissolving one or two or more types of materials containing the cation (C) and the anion (A), and the polymer (P) in the solvent (SO). Hereinafter, this method will be described as a producing method of the electrolytic solution of the present invention.

As the material containing the cation (C) and the anion (A), it is preferable to use a salt in which the cation (C) is paired with the anion (A) from the viewpoint of easy operation. Examples of such salts may include salts in which any one or more of the above-described specific examples of the cation (C) is paired with any one or more of the above-described specific examples of the anion (A). The adding amount of salt may be adjusted so that the relative ratio of the solvent (SO) and the cation (C) in the obtained electrolytic solution is a desired value. As the salt used in production, a salt in a crystal state is usually used. It is preferable that the particle diameter of a crystal is smaller from the viewpoint of promoting dissolution. Specifically, the size of the crystal is preferably 5 mm or less, more preferably 1 mm or less, and further preferably 500 μm or less. The size of the crystal herein may refer to the length in a direction that is the longest of lengths when the crystal is observed from various angles. The lower limit of size of the crystal is not particularly limited, and for example, may be 0.5 μm or more.

The order of dissolving a solute (the salt, the polymer (P), and the like) in the solvent (SO) is not particularly limited, and may be any optional order that achieves easy dissolution. In particular, when the anion (A) contains the first anion (A1) (that is, anion having the largest content molar ratio) and the second anion (A2) (that is, an anion having a next largest content molar ratio next to the first anion (A1)) described above, it is preferable that a salt containing the second anion (A2) is first added, and a salt containing the first anion (A1) is then added, because thereby easy dissolution is easily achieved.

From the viewpoint of promoting dissolution of the solute in the solvent (SO), an operation of firstly producing a dilute solution, and then distilling off a part of the solvent to increase the concentration may be performed. That is, in a case wherein the time required for dissolution of the salt and the polymer (P) in high concentrations in the solvent (SO) is long, the time required for dissolution of the salt and the polymer (P) in low concentrations in the solvent (SO) is short, and the solvent is easily distilled off, the time required for production of the electrolytic solution can be shortened by performing the operation of firstly producing a dilute solution, and then distilling off a part of the solvent to increase the concentration. The concentration of the solute in the dilute solution firstly produced may be, for example, a concentration that is 1/20 to 1/2, and more preferably 1/15 to 1/5 of a desired concentration in the electrolytic solution.

(3. Plastic Composition)

The plastic composition of the present invention is a plastic composition that includes the electrolytic solution of the present invention and a solid material, that has plasticity, and that is for use in an electrochemical device. The solid material is a material capable of maintaining a solid state in the plastic composition under temperature and pressure conditions during use of the electrochemical device. More specifically, the solid material may be a material capable of maintaining a solid state in the plastic composition at normal temperature and normal pressure, e.g., 25° C. and 1 atm. Although the plastic composition itself is a solid having plasticity, the plastic composition is actually a mixture of a solid material and a liquid electrolytic solution. Therefore, they can be separated and recovered.

The plastic composition may contain only one type of solid material, and may also contain multiple types of solid materials. As the plastic composition contains such a solid material and an electrolytic solution that would be in a liquid state if it is not mixed with the solid material, the entirety of the plastic composition as it is becomes a solid having plasticity.

The solid material may specifically include an active material and/or an inorganic solid electrolyte (SE).

The active material is a material capable of functioning as an electrode active material for a positive electrode or a negative electrode in an electrochemical device. Specific examples of the active materials may include lithium oxide such as lithium cobalt oxide, graphite, activated carbon, graphene, silicon and oxides thereof, tin and oxides thereof, sulfur, organometallic complexes, MOFs (Metal-Organic-Framework), and Prussian blue analogs.

The active material preferably has a particulate shape, more preferably has a volume-average particle diameter of 30 μm or less, and still more preferably has a shape of 20 μm or less. The lower limit of such a particle diameter is not particularly limited, and may be, for example, 0.05 μm or more. From the viewpoint of increasing the electrode strength, it is preferable to use a nano-sized active material. This can increase the contact interface area of the plastic composition with other components, increase the strength of the obtained electrode, and enhance the ability of the electrode to promote the electrochemical reaction. The volume-average particle diameter of the active material and other particles may be measured according to JIS K8825.

The inorganic solid electrolyte SE is a material that can function as a constituent element for increasing the ionic conductivity of the insulating layer in the insulating layer of the electrochemical device, i.e., a layer for separating the positive electrode and the negative electrode. Since inorganic solid electrolytes (SE) are often non-combustible or low combustible, the higher the ratio of SE added relative to the electrolytic solution is, the higher the safety of the electrochemical device becomes. The preferable ratio of the inorganic solid electrolyte (SE) added per volume of the total of the electrolytic solution and the inorganic solid electrolyte (SE) is preferably 10 vol % or more, more preferably 30 vol % or more, still more preferably 50 vol % or more, and particularly preferably 70 vol % or more. The upper limit of the preferable ratio of the inorganic solid electrolyte (SE) added per volume of the total of the electrolytic solution and the inorganic solid electrolyte (SE) is not particularly limited, and may be, for example, 99 vol % or less.

Specific examples of the inorganic solid electrolytes (SE) may include a metal oxide-based inorganic solid electrolyte (SE) having a lithium ion conductivity, and an inorganic solid electrolyte (SE) having a sodium ion conductivity. Examples of the metal oxide-based inorganic solid electrolytes (SE) having a lithium ion conductivity may include LAGP ($Li_{1.5}Al_{0.5}Ge_{1.5}P_3O_{12}$), LLZ ($Li_7La_3Zr_2O_{12}$), LLZTO ($Li_{6.75}La_3Zr_{1.75}Ta_{0.25}O_{12}$), LLT (LiLa$_{0.51}$TaO$_{2.94}$), LASTP ($Li_2Al_2SiP_2TiO_{13}$), LTAP ($Li_{1.4}Ti_{1.5}Al_{0.4}P_3O_{12}$) and $Li_{2.99}Ba_{0.005}O_{1+x}Cl_{1-2x}$. Examples of the inorganic solid electrolyte (SE) having a sodium ion conductivity include β-alumina, $Na_{2.99}Ba_{0.005}O_{1+x}Cl_{1-2x}$, and LPS ($Li_7P_3S_{11}$), LGPS ($Li_{10}GeP_2S_{12}$) and $Li_{9.54}Si_{1.74}P_{1.44}S_{11.7}Cl_{0.3}$ as a sulfide-based inorganic solid electrolyte (SE) having a lithium ion conductivity. The inorganic solid electrolyte (SE) is usually a solid particle in a crystalline state having these compositions. Further examples of the inorganic solid electrolytes (SE) may include crystals obtained by adding a small amount of other elements to the above-described compositions, and analogs obtained by slightly changing the above-described compositions.

The intragranular ionic conductivity of the inorganic solid electrolyte SE is preferably $10^{-5}$ S/cm or more, more preferably $10^{-4}$ S/cm or more, still more preferably $10^{-3}$ S/cm or more, and most preferably $10^{-2}$ S/cm or more. The upper limit of the intragranular ionic conductivity of the inorganic solid electrolyte (SE) is not particularly limited, and may be, for example, $10^{0}$ S/cm or less.

The inorganic solid electrolyte (SE) is preferably in a particulate shape, more preferably has a volume-average particle diameter of 20 μm or less, and still more preferably has a shape of 10 μm or less. The lower limit of the volume-average particle diameter of the inorganic solid electrolyte (SE) is not particularly limited, and may be, for example, 0.01 μm or more. The inorganic solid electrolyte (SE) may also serve as a component of the plastic composition for constituting an electrode sheet. In this case, the inorganic solid electrolyte (SE) may be added as a component of the plastic composition by suspending the inorganic solid electrolyte (SE) in an electrolytic solution and mixing such a suspension with other components to produce the plastic composition. When the inorganic solid electrolyte (SE) is used as an electrode sheet, it is preferable that the particle diameter of the inorganic solid electrolyte (SE) is smaller than that of the active material.

The plastic composition may further contain a fibrous material. The fibrous material may constitute a part of the solid material in terms of plasticity. The fibrous material may be a material that also functions as an active material or an inorganic solid electrolyte (SE). When the plastic composition contains the fibrous material, the viscosity of the plastic composition can be adjusted in a desired range, or an additional function can be imparted to the plastic composition.

Examples of the fibrous materials may include a polytetrafluoroethylene fiber, a cellulose nanofiber, a carbon nanotube, a carbon nanofiber, and combinations thereof. The carbon nanotube is particularly preferably a monolayer carbon nanotube.

The fiber diameter of the fibrous material is preferably nano-sized (with a maximum diameter of less than 1 μm). The average fiber diameter of the fibrous material is preferably 0.4 nm or more, and also preferably 500 nm or less, more preferably 100 nm or less. Since the plastic composition contains a nano-sized fiber component, the cohesiveness of the plastic composition can be improved, and a molded article with an excellent strength can be obtained. The fiber diameter may be measured using a microscope such as a scanning electron microscope or a transmission electron microscope, and an arithmetic average thereof may be calculated. When a polytetrafluoroethylene fiber is used as the fibrous material, the aforementioned fiber shape can be formed in the process of producing the plastic composition. Specifically, in the process of producing the plastic composition, a particulate polytetrafluoroethylene may be added into the system, and a shearing force may be applied thereto by kneading or the like, whereby the shape thereof can be deformed into nano-sized fibers in the system.

It is preferable that the fiber length of the fibrous material is equal to or larger than a volume-average particle diameter of solid materials other than the fibrous material. In a case where a member having a layered shape by molding the plastic composition (such as an electrode or an insulating layer) is to be formed, the fiber length of the fibrous material is more preferably half or more of the average thickness of the member, more preferably the average thickness or more, and may be equal to or more than the thickness of the member.

In a preferable embodiment, the solid material contains a particulate solid material and a fibrous material, and in the plastic composition, the fibrous material is present in a state of bridging between particles of the particulate solid material. More specifically, it is preferable that, when the electrode of the present invention is observed by a microscope, there are 10 or more bridges, and more preferably, 20 or more bridges, in a field of view of 100 μm square. If a volatile organic compound is present and is unsuitable for observation, it is preferable to perform drying before performing observation. When the plastic composition has such a bridged structure, it is possible to further improve the cohesiveness of the plastic composition and to obtain a shaped article having a further excellent strength.

(4. Electrode and Insulating Layer, and Producing Methods Thereof)

The electrode sheet for an electrochemical device of the present invention and the insulating layer for an electrochemical device of the present invention contain the above-described plastic composition of the present invention. The producing method of an electrode sheet for an electrochemical device of the present invention includes molding the above-described plastic composition of the present invention into a shape of an electrode sheet. The producing method of an insulating layer for an electrochemical device of the present invention includes molding the above-described plastic composition of the present invention into a shape of an insulating layer.

The electrode sheet may be stacked with a current collector having an appropriate layer shape to constitute an electrode. As the current collector, a metal foil such as a copper foil, an aluminum foil, or a stainless foil may be used.

The shapes of the electrode sheet and the insulating layer are not particularly limited, and may be any desired shapes. From the viewpoint of obtaining a compact high-performance electrochemical device, it is preferable that the electrode sheet and the insulating layer have a thin layer shape. When the electrode sheet and the insulating layer have a layer shape, the thickness thereof is preferably 5 to 200 μm. When the thickness is equal to or more than the above-described lower limit, self-supporting property can be easily obtained. When the thickness is equal to or less than the above-described upper limit, a compact high-performance electrochemical device can be easily produced.

It is preferable that the electrode sheet for an electrochemical device of the present invention and the insulating layer for an electrochemical device of the present invention have self-supporting property. Herein, the self-supporting property refers to a property of maintaining the shape thereof without breaking even when the article is not supported by a supporting body such as a substrate film. Specifically, it is preferable that a sample of the electrode sheet or the insulating layer can maintain the shape thereof to a degree whereby the sample can be lifted with grasping an edge thereof with tweezers, the sample being prepared by cutting the electrode sheet or the insulating layer in a layer shape into a rectangular shape. More specifically, it is preferable that a sample having a rectangular shape of preferably 1-cm square, and more preferably 2-cm square, has such an ability to maintain its shape. When the electrode sheet or the insulating film has such self-supporting property, production of the electrochemical device can be easily performed, and the durability of the produced electrochemical device can be enhanced.

(5. Electrochemical Device)

The electrochemical device of the present invention includes the above-described electrode sheet for an electrochemical device of the present invention, the above-described insulating layer for an electrochemical device of the present invention, or both thereof. The electrode sheet may be stacked with an appropriate current collector having a layered structure such as one described above to be in a state of constituting an electrode, and then may be provided in the electrochemical device. The insulating layer may be provided between a plurality of electrodes (for example, a positive electrode and a negative electrode) in the electrochemical device.

Examples of the electrochemical devices of the present invention may include a primary battery such as a lithium primary battery; a nonaqueous secondary battery such as a lithium ion secondary battery, a lithium metal secondary battery, a sodium ion secondary battery, a potassium ion secondary battery, a magnesium secondary battery, and an aluminum secondary battery; an air battery; a solar battery such as a dye-sensitized solar battery; a capacitor such as an electric double layer capacitor and a lithium ion capacitor; an electrochromic display device; an electrochemical light-emitting element; an electric double layer transistor; and an electrochemical actuator.

In a preferable example, the electrochemical device of the present invention is a battery, and for example, may be a lithium ion secondary battery. More specifically, a battery may be produced in a process wherein a positive electrode current collector such as an aluminum foil, a positive electrode sheet, a separator, a negative electrode sheet, and a negative electrode current collector such as a copper foil are stacked in this order to form a multiple-layered member constituting a battery unit; the multiple-layered member is then inserted in an appropriate outer package; an electrolytic solution is injected into the outer package if necessary; and the opening of the outer package is sealed. In this case, the electrode sheet or the insulating layer of the present invention is adopted for any one or more of the positive electrode sheet, the negative electrode sheet, and the separator, and an electrolytic solution and an active material that are suitable for those of a lithium ion secondary battery are used as the electrolytic solution and the active material constituting the electrode sheet and the insulating layer. Thus, a lithium ion secondary battery may be constituted. When the electrolytic solution is injected into the outer package, the electrolytic solution of the present invention may be used as the electrolytic solution.

In producing the electrochemical device, a step of promoting a reaction such as a cross-linking reaction of the polymer (P) constituting the electrode sheet and the insulating layer may be effected after the step of stacking the electrode sheet and/or the insulating layer. More specifically, promotion of the cross-linking reaction of the polymer (P) may be effected by sealing the opening of the outer package, and then applying a certain energy from the outside of the outer package. Examples of application of an energy may include heating, and irradiation with an energy beam such as visible light, electron beam, and radioactive ray. Among these, application thereof through the outer package may appropriately be selected. In order to achieve such a cross-linking reaction, the electrolytic solution may contain a component that promoting the cross-linking reaction of the polymer (P) in response to the application of an energy, such as a polymerization initiator.

In a preferable example, the electrochemical device of the present invention is a bipolar device, and specifically may be a bipolar battery. The bipolar device is a device provided with an electrode having a bipolar structure. The electrode having a bipolar structure is an electrode having a positive electrode material on a surface of a current collector and a negative electrode agent on another surface thereof. When a plurality of bipolar electrodes are stacked to form a structure, it is possible to constitute a structure in which a plurality of device units are stacked in serial in a single device. For example, a bipolar battery may have a structure in which a plurality of battery units are stacked in series in a single battery pack. As to such a bipolar device, prevention of liquid junction of the electrolytic solution between the device units is highly required. When the electrode and/or the insulating layer of the present invention are adopted as the electrode and/or the insulating layer, such liquid junction can be easily prevented.

A more specific example of the bipolar batteries may be a battery having as an electrode multiple-layered member a member in which a positive electrode current collector such as an aluminum foil, a positive electrode sheet, an insulating layer sheet, a negative electrode sheet, an intermediate foil such as a stainless foil, a positive electrode sheet, an insulating layer sheet, a negative electrode sheet, and a negative electrode current collector such as a copper foil are stacked in this order. Although this example is an example of a structure in which two battery units are stacked in series, the bipolar device may also have a structure in which three or more battery units are stacked in series by adding, to the previous structure, one or more sets of "an intermediate foil such as a stainless foil, a positive electrode sheet, an insulating layer sheet, and a negative electrode sheet".

EXAMPLES

Hereinafter, the present invention will be specifically described by illustrating Examples. However, the present invention is not limited to the Examples described below. The present invention may be optionally modified for implementation without departing from the scope of claims of the present invention and its equivalents.

In the following description, "%" and "part" representing quantity are on the basis of weight, unless otherwise specified. The operation described below was performed under the conditions of normal temperature and normal pressure, unless otherwise specified.

The meanings of the abbreviations relating to the substances used in Examples and Comparative Examples are as follows:

LiFSI: lithium bis(fluorosulfonyl)imide ($Li^+(N(SO_2F)_2)^-$)

LiTFSI: lithium bis(trifluoromethanesulfonyl)imide ($Li^+(N(SO_2CF_3)_2)^-$)

$LiBF_4$: lithium borofluoride

LiDFOB: lithium difluoro(oxalato)borate ($Li^+B(R^X)_3)^-$, where two of $R^X$'s are —F, one of $R^X$'s is —O—CO—CO—O—)

$Mg(TFSI)_2$: magnesium bis(trifluoromethanesulfonyl)imide ($Mg^{2+}((N(SO_2CF_3)_2)^-)_2$)

AN: acetonitrile

EMC: ethyl methyl carbonate

EC: ethylene carbonate

SL: sulfolane

DMS: dimethylsulfone

GBL: gamma-butyrolactone

FEC: fluoroethylene carbonate

DMC: dimethyl carbonate

DEC: diethyl carbonate

TMP: trimethyl phosphate

PTFE: polytetrafluoroethylene

Polymer (P-A): ethylene oxide-propylene oxide copolymer, weight-average molecular weight: 200,000

Polymer (P-B): ethylene oxide-propylene oxide copolymer, weight-average molecular weight: 500,000

Polymer (P-C): ethylene oxide polymer, weight-average molecular weight: 1,000,000

Polymer (P-D): poly(2-ethyl-2-oxazoline), weight-average molecular weight: 500,000

Polymer (P-E): polymethylmethacrylate, weight-average molecular weight: 100,000

Polymer (P-F): poly(2-ethyl-2-oxazolidinone), weight-average molecular weight: 25,000

Production Examples 1 to 14

(P1-1. Preparation of Mixed Liquid)

Salts containing the cation (C) and the anion (A) and the solvent (SO) shown in Table 1 were mixed to obtain a mixed liquid. The ratio of mixing was as in the ratio of the number of moles shown in Table 1 and Table 2. During mixing, if the dissolution speed was slow at room temperature, the system was appropriately warmed.

(P1-2. Determination of Presence or Absence of Precipitate)

The mixed liquid obtained in (P1-1) was left at 15° C. for 3 days and then visually observed, and the presence or absence of a precipitate was determined. When a precipitate was determined to be "present", the shape and size of the precipitate were recorded. As the size of the precipitate, the length in a direction in which the length was the longest when the precipitate was observed from various angle was adopted. Results are shown in Table 3.

18

TABLE 1

| | Type and amount of salt (unit: mole number, relative ratio) | | | | |
|---|---|---|---|---|---|
| Prod. Ex. No. | LiFSI | LiTFSI | LiBF4 | LiDFOB | Mg(TFSI)2 |
| 1 | 1 | | | | |
| 2 | 1 | | | | |
| 3 | 1 | | | | |
| 4 | 1 | | | | |
| 5 | | 1 | | | |
| 6 | | 1 | | | |
| 7 | | 1 | | | |
| 8 | | | 1 | | |
| 9 | | | 1 | | |
| 10 | | | | 1 | |
| 11 | | | | 1 | |
| 12 | 1 | | | | |
| 13 | | | | | 1 |
| 14 | 0.6 | | | | 0.4 |

TABLE 2

| | Type and amount of solvent (unit: mole number, relative ratio) | | | | | | |
|---|---|---|---|---|---|---|---|
| Prod. Ex. No. | AN | EMC | EC | SL | DMS | GBL | FEC |
| 1 | 0.5 | | | | | | |
| 2 | 1 | | | | | | |
| 3 | | 1 | | | | | |
| 4 | | | | | | | 1 |
| 5 | | | | | 0.75 | | |
| 6 | | | | | 3 | | |
| 7 | | | | | | | 2 |
| 8 | | | | 1 | | | |
| 9 | | | | | | 2 | |
| 10 | | | | | | 2 | |
| 11 | | | 4 | | | | |
| 12 | 4 | | | | | | |
| 13 | 4 | | | | | | |
| 14 | 4 | | | | | | |

TABLE 3

| | Precipitation of salt | | |
|---|---|---|---|
| Prod. Ex. No. | Presence/absence of precipitate | Shape | Size |
| 1 | Present | Hexagonal cylinder | 5 mm or more |
| 2 | Present | Hexagonal cylinder | 5 mm or more |
| 3 | Present | Needle | 5 mm or more |
| 4 | Present | Cube | 5 mm or more |
| 5 | Present | Needle | 5 mm or more |
| 6 | Present | Needle | 5 mm or more |
| 7 | Present | Needle | 4 mm |
| 8 | Present | Cube | 1 mm |
| 9 | Present | Needle | 5 mm or more |
| 10 | Present | Cube | 4 mm |
| 11 | Present | Cube | 1 mm |
| 12 | Absent | — | — |
| 13 | Absent | — | — |
| 14 | Present | Needle | 4 mm |

In examples other than Production Examples 12 and 13, precipitation was observed. The shapes of the precipitates were an angled shape and a needle shape, and the sizes of the precipitates were generally 1 mm or more. Therefore it is considered that, when these mixed liquids are used in the inside of an electrochemical device, generation of a precipitate adversely affects the function of the device. Production Example 14 is an example in which a cation in Production Example 12 and a cation in Production Example 13 are present in a mixed manner. Although precipitation was not observed in Production Examples 12 and 13, precipitation was observed in Production Example 14. This shows that when a plurality of types of cations are present in a mixed manner, precipitation easily occurs.

(P1-3. Redissolution by Heating)

After determination in (P1-2), the electrolytic solution containing the precipitate in each of Production Examples 1 to 11 and 14 was further heated at 60° C. for 60 minutes. In all the Production Examples, it was unable to complete redissolution of the precipitate. This is considered to be because the size of the precipitate is large.

Examples 1-1 to 1-22

To each of the mixed liquids prepared in (P1-1) of Production Examples 1 to 14, each of the polymers (P-A) to (P-F) shown in Table 4 (simply abbreviated as "A" to "F" in the Table) was added and dissolved to prepare an electrolytic solution. The type of mixed liquid and the type of polymer used, and the ratio of the polymer added (wt %; percentage of the polymer (P) in 100% by weight of the electrolytic solution) were set as shown in Table 1. In each of the examples, as the step of dissolution, the following two ways of the procedure were attempted:

Procedure (i): keeping the electrolytic solution temperature at 25° C., and adding the polymer to the electrolytic solution and allowing the mixture to stand still.

Procedure (ii): keeping the electrolytic solution temperature at 60° C., and adding the polymer to the electrolytic solution and stirring the mixture.

In all of Examples in which the polymer (P-A) was used and Examples in which the polymer (P-B) was used, the procedure (i) resulted in obtaining a uniform solution by allowing the mixture to stand still for 24 hours, whereas the procedure (ii) in all of those Examples resulted in obtaining a uniform solution by stirring for 30 minutes. Furthermore, the viscosities of the obtained electrolytic solutions were measured. The viscosities were measured with an EMS viscometer (EMS-1000S manufactured by Kyoto Electronics Manufacturing Co., Ltd.) at a rotation number of 1,000 rpm under a hermetically sealed condition so that the composition of the electrolytic solution was not changed and a water moisture in air did not enter thereinto.

In the procedure (i) in Examples in which the polymer (P-C) was used, a transparent insoluble component remained after allowing to stand still for 24 hours, and the mixture was then allowed to stand still for additional 150 hours. As a result, a uniform solution was obtained. In the procedure (ii) in those Examples, stirring for 3 hours resulted in obtaining a uniform solution.

In the procedure (i) in the cases wherein the polymer (P-E) was used, allowing to stand still for 24 hours caused almost no proceeding of dissolution. As dissolution did not proceed even by allowing to stand still for additional 150 hours, preparation of the electrolytic solution was not performed. In contrast, in the procedure (ii), stirring for 20 hours resulted in obtaining a uniform solution.

In the procedure (i) in the cases wherein the polymer (P-D) was used and the cases wherein the polymer (P-F) was used, allowing to stand still for 24 hours caused almost no proceeding of dissolution. As dissolution did not proceed even by allowing to stand still for additional 150 hours, preparation of the electrolytic solution was not performed. In contrast, in the procedure (ii), stirring for 3 hours resulted in obtaining a uniform solution.

Each electrolytic solution obtained was left at 15° C. for 3 days and then visually observed, and the presence or absence of a precipitate was determined. Results are shown in Table 4. Measurement results of viscosity of the electrolytic solutions are shown in Table 5.

TABLE 4

| Ex. | Prod. Ex. No. | Polymer type and adding amount | Presense/absence of precipitate |
|---|---|---|---|
| 1-1 | 1 | B: 5% | Absent |
| 1-2 | 2 | B: 2% | Absent |
| 1-3 | 2 | A: 2% | Absent |
| 1-4 | 2 | E: 2% | Present |
| 1-5 | 3 | B: 2% | Absent |
| 1-6 | 4 | B: 5% | Absent |
| 1-7 | 5 | A: 5% | Absent |
| 1-8 | 5 | A: 10% | Absent |
| 1-9 | 6 | A: 10% | Present |
| 1-10 | 6 | A: 0.9% | Present |
| 1-11 | 7 | B: 5% | Absent |
| 1-12 | 8 | C: 2% | Absent |
| 1-13 | 8 | D: 2% | Absent |
| 1-14 | 9 | B: 0.5% | Present |
| 1-15 | 9 | B: 2% | Absent |
| 1-16 | 9 | B: 5% | Absent |
| 1-17 | 10 | B: 1% | Absent |
| 1-18 | 11 | B: 5% | Absent |
| 1-19 | 12 | B: 2% | Absent |
| 1-20 | 13 | B: 2% | Absent |
| 1-21 | 14 | B: 2% | Present |
| 1-22 | 2 | F: 2% | Absent |

TABLE 5

| Ex. | Measurement temperature (° C.) | Viscosity (cP) |
|---|---|---|
| 1-1 | — | * |
| 1-2 | 25 | 2720 |
| 1-3 | 25 | 962 |
| 1-4 | 25 | 412 |
| 1-5 | 25 | 776 |
| 1-6 | 25 | 6150 |
| 1-7 | — | * |
| 1-8 | — | * |
| 1-9 | 45 | 3710 |
| 1-10 | 25 | 342 |
| 1-11 | 80 | 63700 |
| 1-12 | 25 | 18500 |
| 1-13 | 25 | 22300 |
| 1-14 | 25 | 1620 |
| 1-15 | 25 | 7680 |
| 1-16 | 45 | 24700 |
| 1-17 | 25 | 1730 |
| 1-18 | 25 | 6520 |
| 1-19 | 25 | 10.3 |
| 1-20 | 25 | 255 |
| 1-21 | 25 | 13.7 |
| 1-22 | 25 | 302 |

In Table 5, * represents absence of measurement because the sample was unable to be introduced into a viscometer due to too high viscosity. Therefore, the viscosity in these examples is considered to be a higher than that in Example 1-13 in which measurement at room temperature was possible.

For an electrolytic solution in which a measurement temperature was higher than 25° C., the flowability at 25° C. was low, and measurement was difficult. Thus, measurement at a higher temperature was performed.

In all examples in which a precipitate was determined to be "present" in Examples, a minute precipitate was only observed. When these electrolytic solutions were each used for an electrochemical device, an adverse effect of such a minute precipitate on the electrochemical device was judged to be small. The electrolytic solutions in which the precipitate was observed was subjected to heating at 60° C. As a result, in all the examples, the precipitate was successfully redissolved within 10 minutes.

Example 2: Lithium Ion Secondary Battery (2-1. Positive Electrode)

Into a planetary mixer, 100 parts by weight of lithium cobalt oxide (product name "CELLSEED C" available from Nippon Chemical Industrial Co., Ltd.) as an active material, and 3 parts by weight of acetylene black as a electroconductive filler were charged, and N-methylpyrrolidone was added so that the solid content concentration was 90% by weight. The mixture was mixed with stirring for 20 minutes. Subsequently, poly(vinylidene fluoride) was added in an amount of 1 part by weight based on a solid content, and the mixture was kneaded for 90 minutes at a solid content concentration of 82% by weight. N-methylpyrrolidone was further added to adjust the viscosity thereof. Thus, a slurry was obtained. A positive electrode (basis weight: 10 mg/cm², density: 3.3 g/cm³) was produced using this slurry according to a general method for producing an electrode of a lithium ion battery.

(2-2. Lithium Ion Secondary Battery)

The positive electrode obtained in (2-1), a PTFE membrane filter (product name "Omnipore JMWP04700" available from Merck) having a thickness of 100 μm as a separator, and a lithium metal foil having a thickness of 100 μm as a negative electrode were stacked in this order to constitute an electrode multiple-layered member for a lithium ion secondary battery.

LiFSI and DMC were mixed at a ratio (molar ratio) of LiFSI:DMC=1:3 to obtain a mixed liquid. To this mixed liquid, the polymer (P-B) was added so that the concentration was 0.5% by weight, and dissolved to obtain an electrolytic solution. Into an aluminum laminate outer package for a battery, the electrode multiple-layered member was inserted, and the electrolytic solution was injected. The opening of the outer package was closed to seal a content. Thus, a lithium secondary battery was obtained.

The obtained secondary battery was subjected to a charge-discharge test at a rate of 0.2 C in an environment of 25° C. Within a voltage range of 4.2 to 3.0 V, the secondary battery exhibited a discharge capacity of 140 mAh/g, and repetition of charging and discharging was workable.

Example 3-1: Evaluation of Flame Retardance (3-1-1. Preparation of Electrolytic Solution Containing Flame Retardant Agent)

LiTFSI, DMS, and TMP as a flame retardant agent were mixed at a ratio (molar ratio) of LiTFSI:DMS:TMP=1:2.4: 0.6 to obtain a mixed liquid. To this mixed liquid, the polymer (P-A) was added so that the concentration was 10% by weight, and dissolved to obtain an electrolytic solution. The ratio of trimethyl phosphate in this electrolytic solution was 15.4% by weight. This electrolytic solution is an electrolytic solution in which a part of DMS of the electrolytic solution in Example 1-9 was replaced with TMP.

(3-1-2. Evaluation of Flame Retardance)

100 mg of the electrolytic solution obtained in (3-1-1) was placed in a stainless dish having a diameter of 2 cm, and the flame of a burner was applied onto the electrolytic solution. Then, an ignition state was observed to evaluate combustibility. Even when the flame of the burner was applied, the electrolytic solution was not ignited.

Example 3-2: Evaluation of Flame Retardance

For the electrolytic solution in Example 1-9 (LiTFSI: DMS=1:3, Polymer (P-A): 10% by weight), combustibility was evaluated by the same manner as that of (3-1-2) of Example 3-1. When the flame was applied for 4 seconds, the electrolytic solution was ignited. Two seconds after the ignition, fire was naturally extinguished. When the flame was applied again after the extinguishing, the electrolytic solution was ignited again. Likewise, two seconds after the ignition, fire was naturally extinguished. From this results, it was found that, although this electrolytic solution was ignited, the entire amount of the electrolytic solution was not burned and therefore the electrolytic solution exhibited self-extinguishing properties.

Comparative Example 1

To a 1 M LiPF₆ electrolytic solution (solvent: mixture of EC and DEC at a weight ratio of 50:50) that is used as a standard electrolytic solution for a lithium ion battery, TMP was added so that the concentration was 30% by weight, to obtain a flame retardant electrolytic solution. For this electrolytic solution, combustibility was evaluated by the same manner as that of (3-1-2) of Example 3-1. Immediately after the flame was applied, the electrolytic solution was instantaneously ignited, and combustion was continued until the liquid in the dish was not confirmed. When the flame was applied again after completion of combustion, the electrolytic solution was not ignited. Therefore, it was considered that the electrolytic solution was completely burned. This showed that this electrolytic solution had higher combustibility than the electrolytic solutions in Examples 3-1 to 3-2.

Example 4: Lithium Ion Secondary Battery Formed Using Plastic Composition (4-1. Electrolytic Solution)

LiFSI and EC were mixed at a ratio (molar ratio) of LiFSI:EC=1:2 to obtain a mixed liquid. To this mixed liquid, the polymer (P-B) was added so that the concentration was 5% by weight, and dissolved to obtain an electrolytic solution.

(4-2. Plastic Composition; Positive Electrode Sheet)

10 Parts by weight of the electrolytic solution obtained in (4-1), 1 part by weight of PTFE (powdered PTFE 6-J available from DuPont-Mitsui Fluorochemical Co., Ltd., average particle diameter: 470 μm, bulk density: 470 g/l) as a fibrous material, 100 parts by weight of lithium cobalt oxide, and 3 parts by weight of acetylene black were weighted, and sufficiently kneaded in a mortar to obtain a lump of clay plastic composition. This plastic composition was thinly spread to obtain a positive electrode sheet having a thickness of 100 μm and a thickness precision of ±3'. This sheet was able to be picked up with tweezers even it had a rectangular shape of 6 cm square. This sheet thus had high self-supporting property. This sheet was observed with a scanning electron microscope. As a result, a structure in which the added PTFE formed nanofibers of several nanometers and formed bridges between particles of lithium cobalt oxide and acetylene black was confirmed.

(4-3. Lithium Ion Secondary Battery)

An aluminum foil having a thickness of 25 μm, the positive electrode sheet obtained in (4-2), a separator (product name "Celgard 2325" available from Polypore International, Inc.) impregnated with the electrolytic solution obtained in (4-1), a Li metal foil having a thickness of 100 μm as a negative electrode, and a copper foil having a thickness of 25 μm were stacked in this order to obtain an electrode multiple-layered member for a lithium ion secondary battery. The electrode multiple-layered member was inserted into an aluminum laminate outer package for a battery, and degassed under vacuum for 1 minute, and the opening of the outer package was sealed by heat while the degassed state under vacuum was maintained. Thus, a content was sealed under vacuum to produce a lithium ion secondary battery. A decrease in weight before and after sealing under vacuum was not recognized. Immediately after the production, this battery was subjected to charging and discharging at a rate of 0.1 C in an environment of 25° C. Within a voltage range of 4.2 to 3.0 V, the secondary battery exhibited a discharge capacity of 140 mAh/g, and repetition of charging and discharging was workable. A change in capacity of this battery was measured by repeatedly performing charging and discharging. At the time point when charging and discharging was repeatedly performed 200 times, the capacity was maintained to 90% of initial capacity.

Comparative Example 2: Ionic Conductivity of Prior-Art Electrolytic Solution (C2-1. Preparation of Prior-Art Electrolytic Solution)
LiFSI and GBL were mixed at a ratio (molar ratio) of LiFSI:GBL=1:2 to obtain a prior-art electrolytic solution.
(C2-2. Measurement of Ionic Conductivity)
The ionic conductivity of the electrolytic solution obtained in (C2-1) was measured. The measurement was performed at 25° C. within a frequency range of 1 M to 0.1 Hz by an AC impedance method. As a result, the ionic conductivity was $1.28 \times 10^{-3}$ S/cm.

Example 5: Ionic Conductivity of Electrolytic Solution of Present Invention

To the prior-art electrolytic solution prepared in (C2-1) of Comparative Example 2, the polymer (P-A) was added so that the concentration was 5% by weight, and dissolved to obtain an electrolytic solution of the present invention. The ionic conductivity of this electrolytic solution was measured by the same manner as the measurement method of (C2-2) of Comparative Example 2. As a result, the ionic conductivity was $1.70 \times 10^{-3}$ S/cm, which was a higher value than a value when the polymer was not added.

Comparative Example 3: Ionic Conductivity of Compressed Product of Inorganic Solid Electrolyte Powder 200 mg of LTAP (ionically conductive glass $Li_2O$—$Al_2O_3$—$SiO_2$—$P_2O_5$—$TiO_2$ available from OHARA INC.) powder (volume-average particle diameter: 1 μm, density: 2.8 g/cm$^3$) as an inorganic solid electrolyte was introduced into a columnar measurement cell having a diameter of 10 mm, and pressurized vertically by a pair of SUS electrodes at a pressure of 10 MPa. While this pressurization was maintained, the ionic conductivity at 25° C. was measured. The measurement was performed within a frequency range of 1 M to 0.1 Hz by an AC impedance method. As a result, the ionic conductivity was $3.54 \times 10^{-5}$ S/cm.

This solid electrolyte was in a crystal state that was not pulverized and had an ionic conductivity of $1.5 \times 10^{-3}$ S/cm or more, while the ion conductance of such a compressed product of the powder was a low value as described above regardless of its pressurized state with such a high pressure of 10 MPa. This is considered to be because the powder does not completely come into contact with each other even under pressurization.

Example 6: Ionic Conductivity of Insulating Layer Containing Inorganic Solid Electrolyte Powder 100 mg of the electrolytic solution of the present invention obtained in Example 5 and 10 mg of PTFE fibers as a fibrous material were weighted, and an inorganic solid electrolyte that was the same as one used in Comparative Example 3 was weighted so that the volume fraction of the inorganic solid electrolyte in the entire composition was 70% by volume. They were then sufficiently kneaded. Thus, a lump of clay plastic composition was obtained. This plastic composition had self-supporting property and plasticity. The plastic composition was molded into a sheet shape having a thickness of 200 μm, and the sheet was punched into a disk shape having a diameter of 12 mm, interposed between two disk-shaped SUS plates, and pressurized at a pressure of 0.01 MPa. While this pressurization was maintained, the ionic conductivity at 25° C. was measured. The measurement was performed within a frequency range of 1 M to 0.1 Hz by an AC impedance method. As a result, the ionic conductivity was $2.29 \times 10^{-3}$ S/cm, which was a higher value than the result of measurement of ionic conductivity of the electrolytic solution in Example 5. This suggests that the main factor affecting on ionic conductivity in this system is a solid electrolyte, and suggests that the electrolytic solution served as an agent of improving interface contact properties of the solid electrolyte.

Example 7: Lithium Ion Secondary Battery Including Electrode and Insulating Layer Containing Fibrous Material (7-1. Electrolytic solution)
LiFSI and SL were mixed at a ratio (molar ratio) of LiFSI:SL=1:2 to obtain a mixed liquid. To this mixed liquid, the polymer (P-B) was added so that the concentration was 5% by weight, and dissolved to obtain an electrolytic solution.
(7-2. Plastic Composition; Positive Electrode Sheet)
10 Parts by weight of the electrolytic solution obtained in (7-1), 1 part by weight of a carbon nanotube (product name "ZEONANO SG101" available from ZEON Nano Technology Co., Ltd., arithmetic average particle diameter: 4 nm, arithmetic average length: 400 μm, BET specific surface area: 1,150 m$^2$/g, the same applies hereinafter) as a component serving as an electroconductive material and a fibrous material, and 100 parts by weight of lithium cobalt oxide were weighted, and kneaded in a mortar. Thus, a lump of clay plastic composition was obtained. This plastic composition was thinly spread to obtain a positive electrode sheet having a thickness of 80 μm, a thickness precision of ±3%, and a density of 3.9 g/cm$^3$. This sheet was able to be picked up with tweezers even it had a rectangular shape of 4 cm square. This sheet thus had high self-supporting property.
(7-3. Plastic Composition; Negative Electrode Sheet)
10 Parts by weight of the electrolytic solution obtained in (7-1), 0.4 part by weight of a carbon nanotube as a component serving as an electroconductive material and a fibrous material, and 40 parts by weight of graphite (604A available from Nippon Carbon Co., Ltd.) as a negative electrode were weighted, and kneaded in a mortar. Thus, a lump of clay plastic composition was obtained. This plastic composition was thinly spread to obtain a negative electrode sheet having a thickness of 80 μm and a thickness precision of ±3%. This sheet was able to be picked up with tweezers even it had a rectangular shape of 4 cm square. This sheet thus had high self-supporting property.

(7-4. Plastic Composition; Insulating Layer)

10 Parts by weight of the electrolytic solution obtained in (7-1), 0.1 part by weight of PTFE fibers as a fibrous material, and 5 parts by weight of alumina having a volume-average particle diameter of 5 μm were weighted, and kneaded in a mortar. Thus, a lump of clay plastic composition was obtained. This plastic composition was thinly spread to obtain an insulating layer sheet having a thickness of 50 μm and a thickness precision of ±3%. This sheet was able to be picked up with tweezers even it had a rectangular shape of 4 cm square. This sheet thus had high self-supporting property.

(7-5. Lithium Ion Secondary Battery)

An aluminum foil having a thickness of 25 μm, the positive electrode sheet obtained in (7-2), the insulating layer sheet obtained in (7-4), the negative electrode sheet obtained in (7-3), and a copper foil having a thickness of 25 μm were stacked in this order to obtain an electrode multiple-layered member for a lithium ion secondary battery. The electrode multiple-layered member was inserted into an aluminum laminate outer package for a battery, and degassed under vacuum for 1 minute, and the opening of the outer package was sealed by heat while the degassed state under vacuum was maintained. Thus, a content was sealed under vacuum to produce a lithium ion secondary battery. A decrease in weight before and after sealing under vacuum was not recognized. Immediately after the production, this battery was subjected to charging and discharging at a rate of 0.1 C in an environment of 25° C. Within a voltage range of 4.2 to 3.0 V, the secondary battery exhibited a discharge capacity of 140 mAh/g for the weight of the positive electrode, and repetition of charging and discharging was workable.

Example 8: Evaluation of Change in State Involved in Volatilization of Electrolytic Solution LiFSI and DMC were mixed at a ratio (molar ratio) of LiFSI:DMC=1:1 to obtain a prior-art electrolytic solution. To the prior-art electrolytic solution, the polymer (P-B) was added so that the concentration was 5' by weight, and dissolved to obtain an electrolytic solution of the present invention.

1 g of the prior-art electrolytic solution and 1 g of the electrolytic solution of the present invention were each weighted on a glass dish, and left in a draft chamber of a dried room at a temperature of 18° C. and a dew point of −40° C. or lower. 24 hours after initiation of the leaving, the states of the electrolytic solutions were observed. A decrease in weight of both the electrolytic solutions was confirmed. This is considered to be because 40% of acetonitrile in each of the electrolytic solutions was volatilized. At that time, production of a crystal in the prior-art electrolytic solution was confirmed, although production of a crystal in the electrolytic solution of the present invention was not confirmed. For the electrolytic solution of the present invention, the test was further continued. 48 hours after initiation of the leaving, the state of the electrolytic solution was again observed. At that time, precipitation of a salt was still not confirmed. This showed that in the electrolytic solution of the present invention, salting-out was unlikely to occur even when the solvent was decreased during a long-term use of the electrochemical device.

Example 9: Electrochemical Device Having Bipolar Structure

An aluminum foil having a thickness of 25 μm, a positive electrode sheet, an insulating layer sheet, a negative electrode sheet, a stainless foil having a thickness of 20 μm, a positive electrode sheet, an insulating layer sheet, a negative electrode sheet, and a copper foil having a thickness of 25 μm were stacked in this order to obtain an electrode multiple-layered member for a bipolar battery. As the positive electrode sheet, the insulating layer sheet, and the negative electrode sheet, the positive electrode sheet obtained in (7-2) of Example 7, the insulating layer sheet obtained in (7-4) of Example 7, and the negative electrode sheet obtained in (7-3) of Example 7, respectively, were used. The produced bipolar battery had a configuration in which two cells were arranged in series in the same outer package, and the flowability of the electrolytic solution was low. Therefore, liquid junction of the electrolytic solution did not occur in the inside of the bipolar battery, and repetition of charging and discharging within a voltage range of 8.4 to 6 V was workable.

Example 10: Production of Electrolytic Solution in which Second Salt is First Dissolved LiFSI and LiDFOB were prepared as a first salt containing a first anion and a second salt containing a second anion, respectively.

0.5 mmol (193.8 mg) of the second salt was added to 20 mmol (1.761 g) of ethylene carbonate, and completely dissolved with stirring at 50° C. Subsequently, 9.5 mmol (1.871 g) of the first salt was added thereto and stirred. The first salt was completely dissolved in 1 hour to obtain a mixed liquid. To this mixed liquid, the polymer (P-B) was further added so that the concentration was 5% by weight, and dissolved to obtain an electrolytic solution of the present invention.

On the other hand, 9.5 mmol (1.871 g) of the first salt was added to 20 mmol (1.761 g) of ethylene carbonate, and completely dissolved with stirring at 50° C. Subsequently, 0.5 mmol (193.8 mg) of the second salt was added thereto and stirred. As the second salt was not dissolved, the temperature was thus increased to 70° C., and the mixture was further stirred. The mixture was stirred at 70° C. for 12 hours, but the complete dissolution was not still achieved.

Example 11: Production of Electrolytic Solution Including Step of Distilling Off Solvent An electrolytic solution having the same composition as that in Example 1-2 was prepared by mixing the components at one time. That is, 187.1 g (1 mol) of LiFSI, 41.1 g (1 mol) of acetonitrile, and 4.66 g of the polymer (P-B) were weighted in a glass flask, and stirred at room temperature. It took about 3 hours to completely dissolve all the components.

Separately, 187.1 g (1 mol) of LiFSI, 411 g (10 mol) of acetonitrile, which was 10 times the above-described amount of acetonitrile, and 4.66 g of the polymer (P-B) were weighted in a glass flask, and stirred at room temperature. In about 15 minutes, a solution in which all the components were completely dissolved was obtained. An operation of heating this solution in an oil bath at 90° C. to distill off acetonitrile was performed. After 30 minutes, 9 mol of acetonitrile was distilled off. As a result, an electrolytic solution of the present invention was obtained. A time required for dissolution and distillation was 45 minutes in total. Therefore, the electrolytic solution of the present invention was successfully produced within a shorter period of time.

The invention claimed is:

1. A plastic composition for use in an electrochemical device, the composition comprising an electrolytic solution and a solid material, wherein;

the plastic composition has plasticity; and the electrolytic solution is an electrolytic solution for an electrochemical device, including:

a cation (C) that is a monovalent to trivalent metal ion;

an anion (A);

a solvent (SO) that is a compound having a molecular weight of 1,000 or less; and a polymer (P) that has a weight-average molecular weight of more than 10,000, wherein a content ratio of the solvent (SO) relative to 1 mol of the cation (C) is 0.5 to 4 mol, and a content ratio of the polymer (P) is 0.5% by weight or more.

2. The plastic composition according to claim 1, wherein the solid material includes an active material.

3. The plastic composition according to claim 1, wherein the solid material includes an inorganic solid electrolyte (SE).

4. The plastic composition according to claim 1, wherein the solid material includes a fibrous material.

5. The plastic composition according to claim 4, wherein the fibrous material has an average fiber diameter of 100 nm or less.

6. The plastic composition according to claim 4, wherein the fibrous material is selected from the group consisting of a polytetrafluoroethylene fiber, a cellulose nanofiber, a carbon nanotube, and combinations thereof.

7. The plastic composition according to claim 4, wherein the fibrous material is a monolayer carbon nanotube.

8. The plastic composition according to claim 1, wherein the solid material includes a particulate solid material and a fibrous material, and the fibrous material is present in a state of bridging between particles of the particulate solid material.

9. An electrode sheet for an electrochemical device, comprising the plastic composition according to claim 1.

10. An insulating layer for an electrochemical device, comprising the plastic composition according to claim 1.

11. A producing method of an electrode sheet for an electrochemical device, comprising molding the plastic composition according to claim 1 into a shape of an electrode sheet.

12. A producing method of an insulating layer for an electrochemical device, comprising molding the plastic composition according to claim 1 into a shape of an insulating layer.

13. An electrochemical device comprising: an electrode sheet for an electrochemical device, an insulating layer for an electrochemical device, or both, wherein the electrode sheet for an electrochemical device, insulating layer for an electrochemical device or both includes the plastic composition according to claim 1.

14. The electrochemical device according to claim 13, being a bipolar device.

15. The plastic composition according to claim 1, wherein the electrolytic solution has a viscosity of 500 cP or more.

16. The plastic composition according to claim 1, wherein the anion (A) is an anion containing a boron atom, a fluorine atom, a phosphorus atom, or 2 or more thereof.

17. The plastic composition according to claim 16, wherein:

the anion (A) includes an anion selected from the group consisting of $(B(R^X)_{n1}—F)^-$, $(P(R^X)_{n2}—F)^-$, $(B(R^X)_{n3})^-$, and mixtures thereof;

$R^X$ is a monovalent group or a divalent group that may be, when a plurality thereof exist, the same or different from each other;

the monovalent group is a halogen atom, an alkyl group, an alkenyl group, an alkynyl group, or a monovalent organic ether group;

the divalent group is an alkylene group, an alkenylene group, an alkynylene group, a divalent organic ether group, or an oxo group;

the alkyl group, alkenyl group, alkynyl group, monovalent organic ether group, alkylene group, alkenylene group, alkynylene group, and divalent organic ether group may be substituted with a halogen atom, may be substituted with an oxo group, or may have a heteroatom interposed in a part of the chain;

if $R^X$'s are all monovalent, n1 is 3, and if one of $R^X$'s is divalent and the others are monovalent, n1 is 2;

if $R^X$'s are all monovalent, n2 is 5, if one of $R^X$'s is divalent and the others are monovalent, n2 is 4, and if two of $R^X$'s are divalent and the others are monovalent, n2 is 3; and if $R^X$'s are all monovalent, n3 is 4, if one of $R^X$'s is divalent and the others are monovalent, n3 is 3, and if two of $R^X$'s are divalent, n3 is 2.

18. The plastic composition according to claim 17, wherein the anion (A) includes an anion selected from the group consisting of $PF_6^-$, $BF_4^-$, a difluoro(oxalato)borate ion, a bis(oxalate)borate ion, and mixtures thereof.

19. The plastic composition according to claim 1, wherein the solvent (SO) includes a flame retardant solvent selected from the group consisting of trimethyl phosphate, triethyl phosphate, tripropyl phosphate, tributyl phosphate, trimethyl phosphite, triethyl phosphite, tripropyl phosphite, tributyl phosphite, triphenyl phosphate, triphenyl phosphite, a phosphazene-containing compound, a substituted compound with a substituent in a portion of a hydrocarbon chain of any of these compounds, and mixtures thereof.

20. The plastic composition according to claim 1, wherein the polymer (P) is a copolymer.

21. The plastic composition according to claim 1, wherein the cation (C) includes a divalent or trivalent metal ion.

22. The plastic composition according to claim 1, wherein a weight-average molecular weight of the polymer (P) is 100,000 or more.

23. A producing method of the plastic composition according to claim 1, comprising:

a step of dissolving one or two or more types of materials containing the cation (C) and the anion (A), and the polymer (P) in the solvent (SO) to obtain an electrolytic solution, and a step of mixing the electrolytic solution with a solid material.

24. The producing method according to claim 23, wherein:

the anion (A) includes a first anion (A1) and a second anion (A2);

the first anion (A1) is an anion having a largest content molar ratio in the anion (A);

the second anion (A2) is an anion having a next largest content molar ratio subsequent to the first anion in the anion (A); and the step of dissolving one or two or more types of materials containing the cation (C) and the anion (A), and the polymer (P) in the solvent (SO) comprises a step of adding a salt containing the second anion (A2) to the solvent (SO), and after that, a step of adding a salt containing the first anion (A1).

25. The producing method according to claim 23, wherein the step of dissolving one or two or more types of materials containing the cation (C) and the anion (A), and the polymer (P) in the solvent (SO) comprises distilling off the solvent (SO) after the cation (C) and the salt containing the anion (A) are dissolved in the solvent (SO).

\* \* \* \* \*